US008124147B2

(12) United States Patent
Cheng et al.

(10) Patent No.: US 8,124,147 B2
(45) Date of Patent: Feb. 28, 2012

(54) ORAL POUCH PRODUCTS WITH IMMOBILIZED FLAVORANT PARTICLES

(75) Inventors: Taiben Cheng, Chesterfield, VA (US);
Greg J. Griscik, Midlothian, VA (US);
Diane L. Gee, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 536 days.

(21) Appl. No.: 12/219,114

(22) Filed: Jul. 16, 2008

(65) Prior Publication Data
US 2009/0022856 A1 Jan. 22, 2009

Related U.S. Application Data

(60) Provisional application No. 60/929,855, filed on Jul. 16, 2007.

(51) Int. Cl.
*B65D 29/02* (2006.01)
(52) U.S. Cl. ............ 426/77; 131/347; 131/352; 131/359
(58) Field of Classification Search .................... 426/77; 131/270, 347, 352, 359
See application file for complete search history.

(56) References Cited

U.S. PATENT DOCUMENTS

| 307,537 A | 11/1884 | Foulks |
| 1,234,279 A | 7/1917 | Buchanan |
| 1,376,586 A | 5/1921 | Schwartz |
| 1,992,152 A | 2/1935 | Yeates |
| 2,313,696 A | 3/1941 | Yates |
| 2,306,400 A | 12/1942 | Menzel |
| 2,318,101 A | 5/1943 | Rose |
| 2,330,361 A | 9/1943 | Howard |
| 2,528,778 A | 11/1950 | Piazze |
| 3,067,068 A | 12/1962 | Finberg |
| 3,162,199 A | 12/1964 | Moll, Jr. |
| 3,174,889 A | 3/1965 | Anderson et al. |
| 3,188,265 A | 6/1965 | Charbonneau et al. |
| 3,369,551 A | 2/1968 | Carroll |
| 3,415,286 A | 12/1968 | Arnold et al. |
| 3,600,807 A | 8/1971 | Sipos |
| 3,607,299 A | 9/1971 | Bolt |
| 3,692,536 A | 9/1972 | Fant |
| 3,757,798 A | 9/1973 | Lambert |
| 3,846,569 A | 11/1974 | Kaplan |
| 3,932,192 A | 1/1976 | Nakashio et al. |
| 4,218,286 A | 8/1980 | Jones et al. |
| 4,347,857 A | 9/1982 | Boden |
| 4,386,106 A | 5/1983 | Merritt et al. |
| 4,515,769 A | 5/1985 | Merritt et al. |
| 4,545,392 A | 10/1985 | Sensabaugh et al. |
| 4,565,702 A | 1/1986 | Morley et al. |
| 4,607,479 A | 8/1986 | Linden |
| 4,624,269 A | 11/1986 | Story et al. |
| 4,660,577 A | 4/1987 | Sensabaugh et al. |
| 4,703,765 A | 11/1987 | Paules et al. |
| 4,797,287 A | 1/1989 | Pich et al. |
| 4,880,697 A | 11/1989 | Caldwell et al. |
| 4,892,483 A | 1/1990 | Douglas, Jr. |
| 4,893,639 A | 1/1990 | White |
| 4,906,488 A | 3/1990 | Pera |
| 4,907,605 A | 3/1990 | Ray et al. |
| 4,917,161 A | 4/1990 | Townend |
| 4,971,797 A | 11/1990 | Cherukuri et al. |
| 4,981,522 A | 1/1991 | Nichols et al. |
| 5,127,208 A | 7/1992 | Custer et al. |
| 5,144,964 A | 9/1992 | Demain |
| 5,167,244 A | 12/1992 | Kjerstad |
| 5,174,088 A | 12/1992 | Focke et al. |
| 5,186,185 A | 2/1993 | Mashiko et al. |
| 5,211,985 A | 5/1993 | Shirley, Jr. et al. |
| 5,240,016 A | 8/1993 | Nichols et al. |
| 5,263,999 A | 11/1993 | Baldwin et al. |
| 5,346,734 A | 9/1994 | Wydick, Jr. |
| 5,372,149 A | 12/1994 | Roth et al. |
| 5,387,416 A | 2/1995 | White et al. |
| 5,479,949 A | 1/1996 | Battard et al. |
| 5,525,351 A | 6/1996 | Dam |
| 5,549,906 A | 8/1996 | Santus |
| 5,601,716 A | 2/1997 | Heinrich et al. |
| 5,726,161 A | 3/1998 | Whistler |
| 5,733,559 A | 3/1998 | Citernesi |
| 5,773,062 A | 6/1998 | Cirigliano et al. |

(Continued)

FOREIGN PATENT DOCUMENTS

EP 0212234 A2 7/1986

(Continued)

OTHER PUBLICATIONS

International Preliminary Report on Patentability issued Jan. 19, 2010 for PCT/IB2008/002714.

(Continued)

*Primary Examiner* — Rena Dye
*Assistant Examiner* — Chaim Smith
(74) *Attorney, Agent, or Firm* — Buchanan Ingersoll & Rooney PC

(57) ABSTRACT

An oral pouch product includes an immobilized flavorant comprising one or more flavorants and an immobilizing matrix disposed around the flavorants and containing slightly water soluble β-cyclodextrin, gum Arabic, and/or a starch. In addition, a method for preparing the oral pouch product is described, which includes (a) preparing an immobilized flavorant by mixing a flavorant and one or more matrix-forming materials comprising slightly water soluble β-cyclodextrin, gum Arabic, and/or a starch in a solvent to form a mixture; optionally heating the mixture; and drying the mixture to form a dried immobilized flavorant; and (b) incorporating the dried immobilized flavorant into an oral pouch product.

26 Claims, No Drawings

U.S. PATENT DOCUMENTS

| | | | |
|---|---|---|---|
| 5,780,055 A | 7/1998 | Habib et al. |
| 5,806,408 A | 9/1998 | DeBacker et al. |
| 5,829,453 A | 11/1998 | White et al. |
| 5,921,955 A | 7/1999 | Mazer et al. |
| 5,927,052 A | 7/1999 | Nippes et al. |
| 5,997,691 A | 12/1999 | Gautam et al. |
| 6,021,624 A | 2/2000 | Richison et al. |
| 6,046,177 A | 4/2000 | Stella et al. |
| 6,048,736 A | 4/2000 | Kosak |
| 6,135,120 A | 10/2000 | Löfman et al. |
| 6,143,316 A | 11/2000 | Hayden et al. |
| 6,146,655 A | 11/2000 | Ruben |
| 6,162,516 A | 12/2000 | Derr |
| 6,280,761 B1 | 8/2001 | Santus |
| 6,287,603 B1 | 9/2001 | Prasad et al. |
| 6,287,612 B1 | 9/2001 | Mandava et al. |
| 6,325,859 B1 | 12/2001 | De Roos et al. |
| 6,383,475 B1 | 5/2002 | Meyers et al. |
| 6,414,033 B1 | 7/2002 | Sceusa |
| 6,444,253 B1 | 9/2002 | Conklin et al. |
| 6,455,068 B1 | 9/2002 | Licari |
| 6,557,561 B1 | 5/2003 | Miyauchi et al. |
| 6,565,710 B2 | 5/2003 | Salow et al. |
| 6,706,120 B2 | 3/2004 | Miyauchi et al. |
| D489,606 S | 5/2004 | Lofman |
| 6,793,949 B2 | 9/2004 | Panesar |
| 6,871,473 B1 | 3/2005 | Dutt et al. |
| 6,878,695 B2 | 4/2005 | Woo et al. |
| 6,884,885 B2 | 4/2005 | Qi |
| 6,895,974 B2 | 5/2005 | Peele |
| 6,942,848 B2 | 9/2005 | Nelson et al. |
| 6,958,429 B2 | 10/2005 | Bruhn et al. |
| 6,982,093 B2 | 1/2006 | Licari |
| 6,984,376 B2 | 1/2006 | Stephenson et al. |
| 7,030,092 B1 | 4/2006 | Levine |
| 7,032,601 B2 | 4/2006 | Atchley et al. |
| 7,090,858 B2 | 8/2006 | Jayaraman |
| 7,115,586 B2 | 10/2006 | Loftsson |
| 7,166,671 B2 | 1/2007 | Wood et al. |
| 7,186,701 B2 | 3/2007 | Kubota et al. |
| D568,576 S | 5/2008 | Neidle et al. |
| D585,626 S | 2/2009 | Chappell, Sr. et al. |
| 7,584,843 B2 | 9/2009 | Kutsch et al. |
| 2002/0012689 A1 | 1/2002 | Stillman |
| 2002/0170567 A1 | 11/2002 | Rizzotto et al. |
| 2003/0070687 A1 | 4/2003 | Atchley et al. |
| 2003/0109492 A1 | 6/2003 | Loftsson |
| 2003/0224090 A1 | 12/2003 | Pearce et al. |
| 2004/0015756 A1 | 1/2004 | Chiu et al. |
| 2004/0018293 A1 | 1/2004 | Popplewell et al. |
| 2004/0037879 A1 | 2/2004 | Adusumilli et al. |
| 2004/0118421 A1 | 6/2004 | Hodin et al. |
| 2004/0123873 A1 | 7/2004 | Calandro et al. |
| 2004/0129280 A1 | 7/2004 | Woodson et al. |
| 2004/0145261 A1 | 7/2004 | Ganter et al. |
| 2004/0191322 A1 | 9/2004 | Hansson |
| 2004/0191366 A1 | 9/2004 | Mangos et al. |
| 2004/0202698 A1 | 10/2004 | Ramji et al. |
| 2004/0234479 A1 | 11/2004 | Schleifenbaum et al. |
| 2004/0247649 A1 | 12/2004 | Pearce et al. |
| 2004/0247744 A1 | 12/2004 | Pearce et al. |
| 2004/0247746 A1 | 12/2004 | Pearce et al. |
| 2005/0000531 A1 | 1/2005 | Shi |
| 2005/0003048 A1 | 1/2005 | Pearce et al. |
| 2005/0034738 A1 | 2/2005 | Whalen |
| 2005/0061339 A1 | 3/2005 | Hansson |
| 2005/0081264 A1 | 4/2005 | Brugliera et al. |
| 2005/0100640 A1 | 5/2005 | Pearce |
| 2005/0172976 A1 | 8/2005 | Newman et al. |
| 2005/0178398 A1 | 8/2005 | Breslin et al. |
| 2005/0210615 A1 | 9/2005 | Shastry et al. |
| 2005/0241656 A1 | 11/2005 | Kennison |
| 2005/0244521 A1 | 11/2005 | Strickland et al. |
| 2005/0287249 A1 | 12/2005 | Shukla et al. |
| 2006/0039973 A1 | 2/2006 | Aldritt et al. |
| 2006/0073190 A1 | 4/2006 | Carroll et al. |
| 2006/0118589 A1 | 6/2006 | Arnarp et al. |
| 2006/0144412 A1 | 7/2006 | Mishra et al. |
| 2006/0174901 A1 | 8/2006 | Karles et al. |
| 2006/0191548 A1 | 8/2006 | Strickland et al. |
| 2006/0204598 A1 | 9/2006 | Thompson |
| 2006/0228431 A1 | 10/2006 | Eben et al. |
| 2006/0231113 A1 | 10/2006 | Newbery et al. |
| 2006/0272662 A1 | 12/2006 | Jupe et al. |
| 2006/0275344 A1 | 12/2006 | Mody et al. |
| 2007/0000505 A1 | 1/2007 | Zhuang et al. |
| 2007/0012328 A1 | 1/2007 | Winterson et al. |
| 2007/0048431 A1 | 3/2007 | Budwig et al. |
| 2007/0062549 A1 | 3/2007 | Holton, Jr. et al. |
| 2007/0077307 A1 | 4/2007 | Rosenberg et al. |
| 2007/0095356 A1 | 5/2007 | Winterson et al. |
| 2007/0107747 A1 | 5/2007 | Hill et al. |
| 2007/0122526 A1 | 5/2007 | Sweeney et al. |
| 2007/0186941 A1 | 8/2007 | Holton, Jr. et al. |
| 2007/0186942 A1 | 8/2007 | Strickland et al. |
| 2007/0186943 A1 | 8/2007 | Strickland et al. |
| 2007/0186944 A1 | 8/2007 | Strickland et al. |
| 2007/0190157 A1 | 8/2007 | Sanghvi et al. |
| 2007/0207239 A1 | 9/2007 | Neidle et al. |
| 2007/0261707 A1 | 11/2007 | Winterson et al. |
| 2007/0267033 A1 | 11/2007 | Mishra et al. |
| 2007/0298061 A1 | 12/2007 | Boghani et al. |
| 2008/0014303 A1 | 1/2008 | Jacops et al. |
| 2008/0029110 A1 | 2/2008 | Dube et al. |
| 2008/0029116 A1 | 2/2008 | Robinson et al. |
| 2008/0029117 A1 | 2/2008 | Mua et al. |
| 2008/0081071 A1 | 4/2008 | Sanghvi et al. |
| 2008/0113031 A1 | 5/2008 | Moodley et al. |
| 2008/0166395 A1 | 7/2008 | Roush |
| 2008/0173317 A1 | 7/2008 | Robinson et al. |
| 2008/0196730 A1 | 8/2008 | Engstrom et al. |
| 2008/0202536 A1 | 8/2008 | Torrence et al. |
| 2008/0302682 A1 | 12/2008 | Engstrom et al. |
| 2008/0308115 A1 | 12/2008 | Zimmerman et al. |
| 2008/0317911 A1 | 12/2008 | Schleef et al. |
| 2009/0004329 A1 | 1/2009 | Gedevanishvili et al. |
| 2009/0022917 A1 | 1/2009 | Gedevanishvili et al. |
| 2009/0025740 A1 | 1/2009 | Chappell, Sr. et al. |
| 2009/0025741 A1 | 1/2009 | Crawford et al. |
| 2009/0035414 A1 | 2/2009 | Cheng et al. |
| 2009/0126746 A1 | 5/2009 | Strickland et al. |
| 2010/0218779 A1 | 9/2010 | Zhuang et al. |
| 2010/0300464 A1 | 12/2010 | Gee et al. |
| 2010/0300465 A1 | 12/2010 | Zimmerman |

FOREIGN PATENT DOCUMENTS

| | | |
|---|---|---|
| EP | 0 145 499 | 4/1989 |
| EP | 0352107 A2 | 1/1990 |
| EP | 0483500 A1 | 5/1992 |
| EP | 0 422 898 | 9/1994 |
| EP | 0 599 425 | 10/1997 |
| EP | 1010639 A1 | 6/2000 |
| EP | 1118274 A | 7/2001 |
| GB | 725764 | 3/1955 |
| GB | 924052 | 4/1963 |
| GB | 1139684 | 1/1969 |
| GB | 1350740 | 4/1974 |
| GB | 2074838 A | 11/1981 |
| JP | 03-240665 | 10/1991 |
| WO | WO 94/25356 | 11/1994 |
| WO | WO 97/45336 | 12/1997 |
| WO | WO 99/40799 | 8/1999 |
| WO | WO 00/57713 | 10/2000 |
| WO | WO 01/70591 A1 | 9/2001 |
| WO | WO 02/080707 A1 | 10/2002 |
| WO | WO 03/028492 A1 | 4/2003 |
| WO | WO 03/030881 | 4/2003 |
| WO | WO 03/053175 A2 | 7/2003 |
| WO | WO 2004/009445 | 1/2004 |
| WO | WO 2004/052335 | 6/2004 |
| WO | WO 2004/056219 | 7/2004 |
| WO | WO 2004/058217 | 7/2004 |
| WO | WO 2004/064811 A1 | 8/2004 |
| WO | WO 2004/066986 | 8/2004 |
| WO | WO 2004/095959 A1 | 11/2004 |
| WO | WO 2005/027815 | 3/2005 |
| WO | WO 2005/046363 | 5/2005 |

| | | |
|---|---|---|
| WO | WO 2005/077232 | 8/2005 |
| WO | WO 2005/084446 | 9/2005 |
| WO | WO 2006/004480 A1 | 1/2006 |
| WO | WO 2006/039487 A | 4/2006 |
| WO | WO 2006/065192 | 6/2006 |
| WO | WO 2006/090290 A | 8/2006 |
| WO | WO 2006/105173 A2 | 10/2006 |
| WO | WO 2006/120570 A2 | 11/2006 |
| WO | WO 2006/127772 A | 11/2006 |
| WO | WO 2007/037962 A1 | 4/2007 |
| WO | WO2007/037962 A1 | 4/2007 |
| WO | WO 2007/057789 A2 | 5/2007 |
| WO | WO2007/057789 A2 | 5/2007 |
| WO | WO2007/057791 A2 | 5/2007 |
| WO | WO2007/082599 A1 | 7/2007 |
| WO | WO 2007/104573 | 9/2007 |
| WO | WO 2007/126361 A1 | 11/2007 |
| WO | WO 2008/016520 A2 | 2/2008 |
| WO | WO 2008/042331 A2 | 4/2008 |
| WO | WO 2008/104891 A2 | 9/2008 |
| WO | WO 2008/140372 A1 | 11/2008 |

OTHER PUBLICATIONS

International Search Report and Written Opinion mailed Jul. 17, 2009 for PCT/IB2008/002714.
International Search Report and Written Opinion dated Aug. 6, 2007 for PCT/IB2006/004077.
International Search Report and Written Opinion mailed Mar. 24, 2009 for PCT/IB2008/002764.
International Preliminary Report on Patentability issued Jan. 19, 2010 for PCT/IB2008/002764.
U.S. Appl. No. 12/789,125 to Mishra et al., filed May 27, 2010.
Partial International Search Report dated Oct. 6, 2006 for PCT/IB2006/001611.
International Search Report and Written Opinion dated Feb. 27, 2007 for PCT/IB2006/002680.
International Preliminary Report on Patentability dated Oct. 30, 2007 for PCT/IB2006/001611.
International Preliminary Report on Patentability mailed Dec. 16, 2008 for PCT/IB2006/002680.
International Search Report and Written Opinion dated Sep. 12, 2008 for PCT/IB2008/001378.
International Search Report and Written Opinion dated Jan. 30, 2009 for PCT/IB2008/002598.
International Search Report and Written Opinion mailed Feb. 25, 2009 for PCT/IB2008/002566.
International Preliminary Report on Patentability issued Dec. 11, 2009 for PCT/IB2008/002598.
International Search Report and Written Opinion mailed Mar. 25, 2009 for PCT/IB2008/002682.
International Preliminary Report on Patentability issued Jan. 19, 2010 for PCT/IB2008/002682.
International Search Report and Written Opinion mailed Mar. 31, 2009 for PCT/IB2008/002681.
International Search Report and Written Opinion mailed Jul. 25, 2006 for PCT/IB2006/001114.
U.S. Appl. No. 12/805,868, filed Aug. 20, 2010.
U.S. Appl. No. 12/748,043, filed Mar. 26, 2010.
U.S. Appl. No. 12/748,205, filed Mar. 26, 2010.
U.S. Appl. No. 12/642,399, filed Dec. 18, 2009.
International Preliminary Report on Patentability dated Aug. 28, 2007 for PCT/IB2006/001114.
International Search Report and Written Opinion mailed Mar. 13, 2009 for PCT/IB2008/002694.
International Preliminary Report on Patentability issued Jan. 19, 2010 for PCT/IB2008/002694.
Satel, Sally M.D., "A Smokeless Alternative to Quitting," Apr. 6, 2004, The New York Times, Accessed Oct. 25, 2010; http://query.nytimes.com/gst/fullpage.html?res=9402EFD91E39F935A35757C0A9629C8B63.

ORAL POUCH PRODUCTS WITH IMMOBILIZED FLAVORANT PARTICLES

CROSS-REFERENCE TO RELATED APPLICATIONS

This application claims priority under 35 U.S.C. §119(e) to U.S. provisional Application No. 60/929,855, filed on Jul. 16, 2007, the entire content of which is incorporated herein by reference.

SUMMARY

There is provided an oral pouch product comprising: a porous pouch wrapper; an inner filling material, comprising an immobilized flavorant composition comprising one or more flavorants and an immobilizing matrix which is disposed around the flavorants and contains a slightly water soluble β-cyclodextrin.

There is also provided a method for preparing the oral pouch product, comprising:

(a) preparing an immobilized flavorant, comprising:
  (i) mixing a flavorant and one or more matrix-forming materials comprising a slightly water soluble β-cyclodextrin to form a mixture;
  (ii) optionally heating the mixture; and
  (iii) drying the mixture to form a dried immobilized flavorant; and
(b) incorporating the dried immobilized flavorant into an oral pouch product.

DETAILED DESCRIPTION

In one embodiment is provided an oral pouch product containing an immobilized flavorant composition which includes one or more flavorants and an immobilizing matrix disposed around the flavorants and comprising a slightly water soluble β-cyclodextrin.

As used herein, the term "an oral pouch product" generally denotes a pouch product which can deliver a desirable taste, aroma, chemesthetic effect or combination of two or more of these when placed within the consumer's mouth through contact with the consumer's taste buds, olfactory receptors, or both, preferably via the consumer's saliva. The pouch can include a tobacco-containing or tobacco-free inner filling material.

As used herein, the term "flavorant" denotes a compound having a desirable taste, aroma or both. Examples of suitable flavorants are described herein.

As used herein, the term "slightly water soluble β-cyclodextrin" denotes the β-cyclodextrin that has not been derivatized to increase its water solubility at 25° C. (e.g., a β-cyclodextrin that has not been derivatized with methyl, hydroxypropyl, or other substituent groups that substantially increase its water solubility to above about 2% by weight, based on the total weight of the β-cyclodextrin and water). β-cyclodextrin includes seven glucopyranose subunits and has a cone shape ring structure with a three-dimensional torus configuration including a hydrophobic cavity with a 7.5 Å diameter and hydrophilic upper and lower edges. Underivatized β-cyclodextrin is generally considered to be slightly water soluble at 25° C. within the meaning of this term. Suitable β-cyclodextrins include CAVITRON 82800 (Cargill), and KLEPTOSE (Roquette).

As used herein, the term "immobilizing matrix" denotes a material which is capable of forming an inclusion complex (also referred to as "an inclusion compound"), or a physical encapsulation of a flavorant, or which is capable of sorbing a flavorant, or some combination of these.

As used herein, the terms "immobilizing" or "immobilized" denote the ability to retain the flavorant in a matrix, particle, or bead containing the matrix, under conditions prevalent in manufacturing and/or storage of the oral pouch product, but release the flavorant under conditions prevalent when the oral pouch product is used, and some or all of the matrix, particle, or bead degrades or dissolves.

In an "inclusion complex," a host molecule contains a cavity in which molecular entities of a second chemical species (or guest molecule), i.e., one or more flavorant molecules, are located. There is generally no covalent bonding between the host (i.e., immobilizing matrix) and the guest (i.e., flavorant), the attraction being generally due to van der Waals forces, hydrogen bonds, π-π interactions, electrostatic effects or a combination thereof.

As used herein, the terms "encapsulation" or "encapsulated" refer to a material where an amount of flavorant has been substantially surrounded, enclosed or contained by an amount of immobilizing matrix.

As used herein, the term "matrix-forming material" is intended to include materials which can form, or be a part of, an immobilizing matrix. Examples of suitable matrix-forming materials include β-cyclodextrin, microcrystalline cellulose, carboxymethyl cellulose, starch, alginate, carrageenan, etc., as well as additional and/or processing aids for these materials, such as emulsifiers. These materials can be used individually or in combination thereof.

As used herein, the term "about" can be reasonably appreciated by a person skilled in the art to denote somewhat above or somewhat below the stated numerical value, to within a range of ±10%.

As used herein, the term "size," as used herein, refers to a diameter when the immobilized flavorant particles are substantially spherical in shape, or the length of the longest dimension of immobilized flavorant particles having non-spherical shapes.

Forming an immobilized flavorant entraps at least some of the flavorant molecules in the immobilizing matrix so that the flavorant molecules cannot freely migrate. The immobilized flavorant can release the flavorant molecules only when some or all of the immobilizing matrix is removed or disassociated from the flavorants, or when the immobilizing matrix deforms, cracks, or otherwise loses structural integrity. For example, some or all of the immobilizing matrix may be removed by dissolution in a specific surrounding, or by decomposition or degradation of the immobilizing matrix in moist or warm environments. For example, many of the immobilizing matrices disclosed herein minimize release of flavorant under storage conditions, but slowly release flavorant when contacted with aqueous solutions, more particularly, with saliva of the consumer. The water in the saliva can slowly dissolve the immobilizing matrix, or other saliva components, such as enzymes, can degrade the immobilizing matrix, or some combination of these mechanisms can occur. As a result, flavor degradation and/or losses during handling and storage of pouch products can be reduced or prevented until the appropriate environment for release of the flavorant from the immobilizing matrix is encountered. In addition, the immobilized flavorants described herein can release the flavorant slowly over an extended period of time, thereby providing long-lasting flavor delivery.

Any flavorant which can be immobilized by a matrix containing β-cyclodextrin and subsequently released upon exposure to appropriate conditions without decomposition can be used. Examples of general categories of flavorants which can be used include, but are not limited to, savory, dairy, sweet or fruity flavor, vegetable, spice and herb, wine and distilled beverage, chemesthetic agents, etc. Examples of savory flavorants include, but are not limited to, beef, pork, chicken, turkey, lamb, seafood, ham, meat broth, nut, macadamia, peanut, pecan, pine, walnut, pistachio, almond, chestnut and mixtures of these. Examples of dairy flavorants include, but are not limited to, butter, cheese, sweet cream, sour cream, yogurt, buttermilk, vanilla, ice cream, and mixtures of these. Examples of sweet or fruity flavorants include, but are not limited to, orange, strawberry, raspberry, cranberry, banana, peach, mango, passion fruit, apple, grape, caramel, watermelon, chocolate, honey flavor, and mixtures of these. Examples of vegetable flavorants include, but are not limited to, celery, lettuce, broccoli, tomato, green pepper, cucumber, carrot, radish, horseradish, wasabi, beet, leek, shallot, onion, garlic, and mixtures of these. Examples of spice and herb flavorants include, but are not limited to, clove, oregano, lemon, lime, jasmine, garlic, ginger, eucalyptus, geranium, dill, cumin, cardamom, cinnamon, green tea, red tea, black tea, coffee, cassia, coriander, rose, rosemary, basil, star anise, sweet fennel, sweet marjoram, thyme, violet leaf, spearmint, peppermint, and mixtures of these. Examples of wine and distilled beverage flavorants include, but are not limited to, red wine, white wine, whisky, brandy, cognac, rum, gin, and mixtures of these.

Preferably, the flavorant is lipophilic, i.e., having an affinity for lipids, or has at least one lipophilic portion in the molecule. Lipophilic moieties of a flavorant tend to be able to form relatively stronger non-covalent bonds with the hydrophobic portions of β-cyclodextrin. In a preferred embodiment, the flavorant can be in the form of a liquid, and in particular, an oily liquid. Examples of suitable flavorants may include, but are not limited to, orange oil, mint oil, such as peppermint oil and spearmint oil, menthol, cinnamon oil, vanilla flavor, honey flavor and fruity flavor such as berry flavor. A single immobilizing matrix may contain one kind of flavorant, or two or more different kinds of flavorants, immobilized therein.

Preferably, the immobilized flavorant may contain the flavorant in any flavoring-effective amount. Preferably, flavorant is present in an amount ranging from about 4 wt % to about 60 wt %, and more preferably, about 12 wt % to about 35 wt %, and most preferably, about 15 wt % to about 20 wt %, based on the weight of β-cyclodextrin.

The immobilized flavorant described herein can be prepared by a number of suitable methods. Two preferred methods include (1) preparing a hydrocolloidal suspension of the flavorant, and suspending particles of β-cyclodextrin therein using high shear mixing, preferably at atmospheric pressure, and (2) kneading a paste or dough of β-cyclodextrin and flavorant in, e.g., a ribbon blender.

In a preferred embodiment of method (1), a suspension of β-cyclodextrin and water can be heated, for example, to about 180° F. to about 200° F., and stirred, for example, for about 20 minutes to about 30 minutes, until β-cyclodextrin is substantially or completely suspended in the water. The amount of β-cyclodextrin in the mixture can be any amount effective to immobilize the flavorant; preferably, this amount can range between about 14 wt % and about 65 wt %, and more preferably, between about 20 wt % and about 30 wt %, based on the weight of water. Thereafter, one or more flavorants can be added to and mixed with the resulting suspension, preferably at about the same temperature, e.g., over a time period of about 5 minutes. This provides an aqueous mixture containing immobilized flavorant, which is desirably at least partially in the form of an inclusion complex.

While not wishing to be bound by any theory, it is believed that flavorant molecules penetrate the β-cyclodextrin particles in aqueous suspension, and form inclusion complexes with the β-cyclodextrin rings. Because the β-cyclodextrin is only slightly soluble, the solid β-cyclodextrin-flavorant material immobilizes the flavorant and provides a sustained release matrix when in contact with an aqueous solution, such as saliva.

If the flavorant is an oil, or is dissolved in an oil vehicle, this preparation method can advantageously use a high shear mixer or homogenizer to create a hydrocolloidal suspension of the flavorant in the β-cyclodextrin particulate suspension. One or more emulsifiers can be included in the mixture to stabilize this hydrocolloidal suspension.

A preferred suitable emulsifier is diacetyl tartaric acid ester of mono-diglyceride (DATEM), which can be added to the mixture containing the flavorant and β-cyclodextrin. Emulsifier can generally be used in any emulsifying effective amount, and generally in an amount up to about 2 wt %, and more preferably, about 0.5 wt %, based on the total weight of the mixture. Emulsifier can advantageously be added prior to or during high shear mixing or homogenization. Homogenization forms the immobilized flavorant into relatively uniform small particles which can be suspended in water, such as a hydrocolloidal suspension. The formation of the hydrocolloid of flavorant assists in transporting the flavorant to the β-cyclodextrin particles and in the formation of the inclusion complex within the particles.

The resulting mixture is desirably cast into a film, granulated, or otherwise prepared for drying, as described in more detail below.

In a preferred embodiment of method (2), solid β-cyclodextrin is moistened with water to form a paste or dough, to which is added a solution, suspension, or emulsion of flavorant. The β-cyclodextrin, flavorant-containing liquid, and any additional water or aqueous solution necessary to obtain the desired consistency can be mixed using a ribbon blender, Banbury, or other mixing apparatus capable of mixing high solids content materials. While not wishing to be bound by any theory, it is believed that the kneading of the liquid flavorant with the solids causes the liquid to disperse into the solid and become physically entrapped therein, where flavorant molecules combine with β-cyclodextrin molecules to form inclusion complexes. The dough-like material can be extruded into a noodle or other form, and if desired, spheronized, using known techniques, into an immobilized flavorant-containing bead, which can then be incorporated into an oral pouch product.

In either of the above methods, or in any other methods that might be used, the flavorant, β-cyclodextrin, water and any other ingredients can optionally be heated before, during, or after the mixing process, to aid in processability of the material, and to assist in the formation of the inclusion complex. Heating can be conducted to reach and maintain any temperature suitable to aid in formation of the inclusion complex of flavorant and β-cyclodextrin, typically below the boiling point of the mixture, and more particularly to a temperature ranging between about 150° F. and about 210° F., more particularly to a temperature of around 180° F.

Other matrix-forming materials can be included in the mixture prepared by either of the methods disclosed above, or by any other method. For example, to further improve the physical strength, integrity, and processability of the immobilized flavorant, microcrystalline cellulose (MCC) can be added, e.g., during preparation of immobilized flavorant. MCC is a structure-building material which helps to provide physical encapsulation of the flavorant immobilized in the immobilizing matrix. In addition, due to the low solubility of the MCC, it can also help to adjust the degradation and release rate of the flavorant during consumption of the oral pouch product. MCC may be added in an amount ranging from about 1 wt % to about 5 wt %, preferably, about 2 wt % to about 3 wt %, and more preferably about 2.5 wt %, based on the total weight of the mixture.

In addition or alternatively, one or more natural or modified starches or polysaccharides, such as gum Arabic, alginate, carboxymethyl cellulose (CMC), carrageenan and other ingredients, such as sweeteners, may be added to the mixture. When starches are used, they can preferably be added in an amount ranging from about 5 wt % to about 15 wt %, and more preferably, about 8 wt % to about 12 wt %, based on the total weight of the mixture. Further, CMC can be added in an amount up to about 2 wt %, and preferably, about 0.2 wt % to about 0.8 wt %, based on the total weight of the mixture. Carrageenan may be added in an amount ranging from about 1 wt % to about 6 wt %, and preferably, about 2 wt % to about 4 wt %, based on the total weight of the mixture. Sweeteners, such as natural sugar (i.e., sucrose), fructose, and/or sucralose, may be added in amounts ranging from about 2 wt % to about 20 wt %, preferably, from about 3 wt % to about 9 wt %, and most preferably, about 4 wt % to about 6 wt %, based on the total weight of the mixture. Again, the amounts of these matrix-forming materials may be varied so that their contribution to the overall solubility of the immobilizing matrix helps to regulate and control the degradation rate of the immobilizing matrix, and thus the rate of release of flavorant from the oral pouch product containing the immobilized flavorant. In addition, these components, and the amounts thereof, may be chosen so that they provide a pumpable slurry, making the mixture easier to cast into a film.

Upon mixing the flavorant, water, and other matrix forming materials to form a aqueous mixture, suitable mixtures have been found to have compositions within the ranges (in wt % based on the total weight of the mixture): MCC, about 1 to about 5 wt %, more particularly, about 2 wt % to about 3 wt %; water, about 20 wt % to about 70 wt %, more particularly about 20 wt % to about 50 wt % or about 40 wt % to about 70 wt %; β-cyclodextrin, about 10 wt % to about 40 wt %, more particularly about 10 wt % to about 25 wt % or about 20 wt % to about 40 wt %; sweeteners (sucrose, sucralose, fructose, etc.), about 2 wt % to about 20 wt %, more particularly about 2 wt % to about 11 wt % or about 6 wt % to about 20 wt %; starch, about 5 wt % to about 15 wt %; carrageenan, about 1 wt % to about 6 wt %; flavorant, about 1 wt % to about 10 wt %, more particularly about 1 wt % to about 6 wt %; CMC, 0 to about 2 wt %; emulsifier, 0 to about 2 wt %.

The aqueous mixture containing immobilized flavorant, whether in the form of a liquid suspension or a solid dough, can be dried to remove at least some of water. Preferably, prior to drying, the mixture may be cooled to ambient temperature, for example, by using a cool water bath or a heat exchanger. The drying can be carried out by any suitable method. The drying step can be carried out, for example, by placing the mixture in a tray made of silicon or aluminum, in a dryer such as a conventional oven and a vacuum oven for batch processing, and a continuous belt dryer for continuous processing. The drying temperature and drying time may vary depending on the drying method involved. For example, the mixture can be dried in a conventional oven at a temperature ranging from about 60° C. to about 80° C., and preferably, about 70° C., for about 16 hours to about 20 hours, and preferably, about 18 hours. The mixture can also be dried in a vacuum oven at a temperature ranging from about 80° C. to about 100° C., and preferably, about 90° C., for about 1 hour to about 5 hours, and preferably, about 3 hours. Preferably, the moisture content in the dried immobilized flavorant composition is about 1 wt % to about 10 wt %, preferably, about 3 wt % to about 7 wt %, and most preferably, about 5 wt %.

The dried immobilized flavorant may be in any form, such as a chip, granule, block, extrudate, bead, or film, and can be used as obtained. Preferably, the dried immobilized flavorant can be further processed to form smaller units, such as particles or powders, by any suitable method. Examples include milling, spheronizing and shredding processes (collectively "pulverizing processes"). The particles resulting from the pulverizing process may take a variety of shapes and sizes. Preferably, the immobilized flavorant particles can have a size ranging from about 200 mesh to about 10 mm.

The oral pouch products that incorporate the immobilized flavorant particles described herein can take various shapes, which are preferably designed to be inserted into the oral cavity, where they come into contact with the user's saliva, and release flavorant into the saliva. Typically this release of flavorant is designed to occur according to a time profile. For example, a flavorant release profile may include a burst of flavorant when the oral pouch product is first introduced into the oral cavity, followed by a slow decrease in flavorant release over time, or may include a steady release of flavorant over the consumption of the pouch product. The immobilized flavorant particles described herein may be incorporated into oral pouch products in amounts ranging from about 3 wt % to about 50 wt %, based on the total weight of the oral pouch product.

Preferred oral pouch products include tobacco containing and tobacco free oral flavor delivery pouch products. Oral flavor delivery pouch products can be made by a variety of suitable methods, including, e.g., the formation of a layer of pouch wrapper material by extrusion, film casting, or other technique, and the folding and/or adherence of several edges of the layer together to form a cavity. Typically, the cavity of an oral flavor delivery pouch product is adapted to contain a filling material enclosed in a non-dissolvable porous pouch wrapper material. Immobilized flavorant particles prepared as described herein and that contain the same flavorant, or that contain two or more different flavorants, may be used in an oral delivery pouch product by introducing the particles as filling material into the cavity of the pouch, or by incorporating the particles into the pouch wrapper material during the formation of the pouch wrapper, or both.

Because underivatized β-cyclodextrin has a relatively low water solubility at 25° C. (generally less than about 2 wt %, more particularly between about 1 wt % and about 2 wt %), the immobilized flavorant can be gradually released from the oral pouch product into the saliva of the consumer over a relatively long period of time. By increasing the concentration of β-cyclodextrin in the immobilizing matrix (as well as by increasing the concentration of other insoluble or slightly water soluble matrix-forming materials), the length of flavorant release can be increased, resulting in longer lasting flavorant to the consumer. By increasing the concentration of water-soluble matrix-forming components in the immobilizing matrix, a faster release of flavorant can be obtained.

The flavorant release profile of the immobilized flavorant may further be manipulated by adjusting the size of the flavor particles. Generally, larger immobilized flavorant particles will release flavorant over a longer period of time compared to smaller particles.

Preparation of immobilized flavorant particles is further illustrated below with respect to certain non-limiting, exemplary embodiments. The term "wt %" used below denotes a weight percent based on the total weight of the mixture or composition.

Preparation of Immobilized Flavorant Particles

EXAMPLE 1

Oil-based Flavorant

MCC (2.5 wt %), starch (High Cap 100, 9.5 wt %), sodium carboxymethyl cellulose (CMC K-7000, 0.4 wt %), sucrose (3 wt %), sucralose (1.5 wt %) and carrageenan (2.5 wt %) were combined in a vessel. Water (59.6 wt %) at about 40° F. was added. The resultant mixture was heated to 180° F. using a high shear mixer until all the solids were completely dissolved. Thereafter, β-cyclodextrin (17.5 wt %) was added to the mixture by using a high shear mixer to suspend the β-cyclodextrin in the aqueous mixture. In another container, diacetyl tartaric acid ester of mono-diglyceride (DATEM) (Panodan 150 K, 0.5 wt %) was added to peppermint oil (3 wt %). This mixture was stirred until the DATEM was completely dissolved in the peppermint oil. This peppermint oil solution was then added to the β-cyclodextrin solution and the resultant mixture was heated to 180° F. The mixture was then homogenized in a high shear mixer at 3500 psi and quickly cooled to ambient temperature by using a cool water bath. The cooled mixture was poured into a tray and placed in a conventional oven at 90° C. for 16 hours or a vacuum oven at 90° C. for 3 hours to form a dry film. The dried film can be pulverized into particulates, which can be incorporated into oral pouch products.

Other particulate compositions containing oil-based or oil soluble flavorants can be made by making appropriate variations to the above example. The amounts of components used can generally vary. Suitable results can be obtained by varying the amounts of components within the ranges: MCC, about 1 wt % to about 5 wt %, more particularly, about 2 wt % to about 3 wt %; water, about 40 wt % to about 70 wt %; β-cyclodextrin, about 10 wt % to about 25 wt %; sweetener, about 2 wt % to about 11 wt % (e.g., sucralose, about 1 wt % to about 5 wt %, sucrose, about 1 wt % to about 6 wt %, more particularly about 2 wt % to about 4 wt %); starch, about 5 wt % to about 15 wt %; carrageenan, about 1 wt % to about 6 wt %; oil based or oil-soluble flavorant, about 1 wt % to about 6 wt %; CMC (optional), 0 to about 2 wt %; DATEM or other emulsifier, 0 to about 2 wt %.

EXAMPLE 2

Aqueous Flavorant

MCC (2.5 wt %, Avecil LM 310), crystalline fructose (9 wt %), sucralose (1 wt %), carrageenan (1.5 wt %, lactarin MV 306) are combined together, and mixed with water (39.5 wt %), liquid honey (5 wt %) in a vessel to form a premix. The premix is transferred to a second vessel using a high shear mixer and is heated to 140° F. until all solids are completely dissolved. β-cyclodextrin (26 wt %), honey flavor (6 wt %), and starch (9.5 wt %, HiCap 100) are added using a high shear mixer, and the resulting mixture is heated to 180° F., then is quickly cooled to room temperature. A thin layer of Lamchem PMD K is applied to an aluminum tray, and the mixture is cast as a thin film on the aluminum tray and dried at 90° C. overnight. The dried film can be pulverized into particulates, which can be incorporated into oral pouch products.

Other particulate compositions containing aqueous flavorants, and particularly other honey-flavored particulate compositions, can be made by making appropriate variations to the above example. The amounts of components used can generally vary. Suitable results can be obtained by varying the amounts of components within the ranges: MCC, about 1 wt % to about 5 wt %; water, about 20 wt % to about 50 wt %; β-cyclodextrin, about 20 wt % to about 40 wt %; sweetener, about 6 wt % to about 20 wt % (e.g., sucrolose, about 1 wt % to about 6 wt %, fructose, about 5 wt % to about 15 wt %); starch, about 5 wt % to about 15 wt %; carrageenan, about 1 wt % to about 6 wt %; honey flavor or other water-soluble flavorant, about 1 wt % to about 10 wt %; honey (optional), 0 to about 10 wt %. In general, because the flavorant is water-soluble, there is no need for an emulsifier to prepare these compositions. In addition, while homogenization or high shear mixing may be desirable and gives good results, it is not strictly necessary to achieve adequate mixing.

The immobilized flavorant particles or beads described herein are advantageously incorporated into oral pouch products. The oral pouch product provides for the delivery of an engaging, flavorful, aromatic, energizing, and/or soothing experience by delivering ingredients to a user in a consumable unit designed to be inserted in the mouth. At least some of these ingredients are provided by an inner filling material, which contains the immobilized flavorant particles or beads as described above, and may contain other materials, including flavorant materials, such as botanical materials like tobacco fibers, botanical fibers, or capsules, beads, powders, granules, extracts, or other food grade materials. The filling material is enclosed in a porous pouch wrapper between opposed layers of the pouch wrapper, which may also be provided with coatings that can release flavorants or other ingredients to the user's mouth when in contact with saliva. The inner filling material can completely fill the interior of the porous pouch wrapper, or may partially fill the interior of the porous pouch wrapper.

The oral pouch product generally is sized and configured to fit comfortably in a users mouth, and typically has maximum dimensions of about 0.1 inches to about 2.0 inches. It can desirably be shaped like a half-moon or D-shape, or can take other shapes, including, without limitation a sphere, rectangle, square, oval, pouch-shape, crescent, rod-shape, or oblong, cylindrical, tea leaf, tear drop, or hourglass shapes. In some embodiments, the pouch-shape can be similar to a ravioli or pillow shape. Other shapes may be utilized so long as the shapes fit comfortably and discreetly in a users mouth. In some embodiments, the shape of the pouch can indicate the releasable ingredient, such as the flavor. Thus, in these embodiments, the pouch may be shaped as fruits, vegetables, or other objects that connote a particular releasable ingredient. For instance, the pouch could be in the shape of a banana to indicate a banana flavor.

The oral pouch product can preferably deliver a plurality of flavor and/or functional ingredients to the user for a period of about one minute to about 1 hour. Preferably, the pouch is discarded after a single use. Preferably, the oral pouch product weighs between about 0.2 g and 5.0 g. The weight is predominately the result of the weight of the enclosed inner filling material.

The porous pouch wrapper described herein can be made of a porous material, such as a paper or fabric, such as a nonwoven fabric or a paper of the type used to construct filters or tea bags. The porous pouch wrapper should be capable of allowing the flavors and functional ingredients contained in the inner filling material of the oral pouch product to diffuse through the pouch wrapper and into the user's mouth. The porous pouch wrapper should also be capable of accepting the coating material as described herein. Desirably, the porous pouch wrapper is made from a material suitable for contact with food, such as materials used in packaging or handling foods. Preferred porous materials include, but are not limited to, films, gelatin, food casings, carrageenan, biopolymers, fabric and/or paper such as filter paper, papers used to construct tea bags, coffee filters, and the like.

In addition to the immobilized flavorant particulates or beads described herein, the inner filling material of the oral pouch product described herein can include botanical fibers, powders, extracts, capsules, microcapsules, beads, granules, liquids, semi-liquids, gels, and other food grade materials. These materials can form part of a matrix that is held together as a pliable mass by a binder. The inner filling material can be a tobacco containing or tobacco-free filling, and preferably includes sweeteners, flavorants, coloring agents, functional ingredients, and the like. The inner filling material can be in the form of particles, capsules, microcapsules, beads, granules, or fibers, or can be in the form of a monolithic solid mass.

If a binder is present in the inner filling material, it is preferably a food grade adhesive, gum, or other binder. Suitable binders include, without limitation, sodium alginate, sugar, agar, guar gum, and the like. In a preferred embodiment, the binder is added in an effective amount such as about 10% to about 60% by weight of the oral pouch product.

An inner filling material of an oral pouch product may, instead of β-cyclodextrin or in addition to β-cyclodextrin, comprise in the immobilized flavorant composition, gum Arabic (also called gum acacia), and/or a modified food starch.

A further exemplary composition includes microcrystalline cellulose ("MCC") (Avecil LM 310) as a carrier, sucrose as a sweetener, starch (High-Cap 100) as a first encapsulation agent, gum Arabic as a second encapsulation agent, carrageenan (Lactarin MV 306) as a thickening agent, monodiglyceride (Grindsted Mono-Di HV52-K-A) as an emulsifier, spice oil 10179-55B-2 as a flavor agent, sucralose as an artificial sweetener, and water.

A further exemplary method includes (1) mixing carrageenan, MCC, and sugar together in a bag to form a powder mix; (2) adding water to a beaker; (3) transferring the powder mix to beaker and applying heat to 180° F. (about 82° C.) using a high shear mixer; (4) making sure all the powder is completely dissolved; (5) adding gum Arabic and Hi-Cap 100 using high shear mixing; (7) adding mono-diglyceride to spice oil until dissolved; (8) adding spice oil to the previous solution; (9) heating to 180° F. (about 82° C.) for 20 minutes; (9a) passing through a homogenizer at 3000 pounds per square inch of pressure (about 200 atmospheres); (10) quickly cooling to room temperature with cool water bath; (11) measuring viscosity; and (12) making a thin film on a tray and drying it overnight at 90° C.

A preferred filling material contains, by weight before optional drying, about 1-8% MCC, more preferably about 4% MCC, about 0-5% sugar, more preferably about 2% sugar, about 10-40% starch, more preferably about 15% starch, about 5-35% gum Arabic, more preferably about 10% gum Arabic, about 1-5% carrageenan, more preferably about 2.5% carrageenan, about 2-10% flavor oil, more preferably about 8% flavor oil, and about 30-70% water, most preferably about 57% water. The filling material may include, by weight before optional drying, about 0-2% monodiglyceride, more preferably about 0.5% monodiglyceride, and about 0-2% sucralose, more preferably about 1% sucralose.

While various embodiments have been described, variations and modifications may be made without departing from the spirit and the scope of the invention. Such variations and modifications are to be considered within the purview and scope of the invention as defined by the appended claims.

The invention claimed is:

1. An oral pouch product designed for insertion in the oral cavity for the sustained release of flavorant, comprising:
   a porous pouch wrapper;
   an inner filling material in particulate form, comprising an immobilized flavorant composition, comprising:
      one or more flavorants; and
      an immobilizing matrix disposed around the one or more flavorants and comprising slightly water soluble underivatized β-cyclodextrin, wherein said one or more flavorants is capable of being released from said immobilizing matrix over an extended period of time when said oral pouch product is in contact with saliva within the mouth thereby yielding the gradual delivery of said one or more flavorants.

2. The oral pouch product of claim 1, wherein
   (i) the immobilizing matrix further comprises an emulsifier;
   (ii) the immobilizing matrix further comprises diacetyl tartaric acid ester of mono-diglyceride;
   (iii) the immobilizing matrix further comprises one or more materials selected from the group consisting of microcrystalline cellulose, carboxymethyl cellulose, starch, alginate, and carrageenan;
   (iv) the one or more flavorants are selected from the group consisting of savory, dairy, sweet, fruit, vegetable, spice, herb, wine, and distilled beverage flavorants;
   (v) the one or more flavorants comprise a liquid flavorant;
   (vi) the inner filling material further comprises a botanical material; or
   (vii) two or more of (i) through vi.

3. The oral pouch product of claim 2, wherein the liquid flavorant comprises a lipophilic flavorant.

4. The oral pouch product of claim 3, wherein the liquid lipophilic flavorant is selected from the group consisting of orange oil, mint oil, cinnamon oil, vanilla flavor, berry flavor, honey flavor, fruit flavor, and combinations thereof.

5. The oral pouch product of claim 1, wherein the filling material is tobacco-free.

6. A method for preparing an oral pouch product designed for insertion in the oral cavity for the sustained released flavorant according to claim 1, comprising:
   (a) preparing an immobilized flavorant, comprising:
      (i) mixing a flavorant and one or more matrix-forming materials comprising a slightly water soluble underivatized β-cyclodextrin to form a mixture;
      (ii) optionally heating the mixture; and
      (iii) drying the mixture to form a dried immobilized flavorant; and
   (b) incorporating the dried immobilized flavorant while in particulate form into said oral pouch product.

7. The method of claim 6:
   (1) wherein said mixing is carried out in a solvent comprising water;
   (2) further comprising forming a film from the mixture, and wherein the drying of the mixture comprises forming a dried film;
   (3) wherein the heating is carried out by heating the mixture to between about 180° F. and about 200° F.;
   (4) wherein said mixing occurs in a ribbon blender;
   (5) wherein said mixing occurs at atmospheric pressure;

(6) further comprising extruding the optionally heated mixture to form an extrudate and spheronizing the extrudate, and drying the spheronized extrudate to form beads of dried immobilized flavorant;
(7) wherein said mixing forms a pumpable slurry;
(8) further comprising forming a film from the mixture, and wherein the drying of the mixture comprises forming a dried film, and still further comprising pulverizing the dried film into particles; or
(9) two or more of (1) through (8).

8. The method of claim 7, wherein the particles of pulverized dried film have a size ranging from about 200 mesh to about 10 mm.

9. The method of claim 6, wherein:
(1) the one or more matrix-forming materials further comprises an emulsifier;
(2) the one or more matrix-forming materials further comprises a material selected from the group consisting of microcrystalline cellulose, carboxymethyl cellulose, starch, alginate, carrageenan, and combinations thereof;
(3) the flavorant is selected from the group consisting of savory, dairy, fruit, vegetable, spice, herb, wine, and distilled beverage flavorants;
(4) the pouch product further comprises an inner filling comprising a botanical material; or
(5) two or more of (1) through (4).

10. The method of claim 9, wherein the one or more matrix-forming materials further comprises the emulsifier, the method further comprising forming an emulsion of the mixture, optionally using a high shear mixer.

11. The method of claim 10, wherein the forming of the emulsion comprises subjecting the mixture to homogenization and optionally heating the mixture.

12. The method of claim 6, wherein the mixing comprises combining, in the amounts indicated based on the total weight of the mixture:
water, about 20 wt % to about 70 wt %;
underivatized β-cyclodextrin, about 10 wt % to about 40 wt %; and
flavorant, about 1 wt % to about 10 wt %.

13. The method of claim 12, where said mixing further comprises:
(1) combining microcrystalline cellulose in an amount of about 1 wt % to about 5 wt % with the mixture;
(2) combining starch in an amount of about 5 wt % to about 15 wt % with the mixture;
(3) combining carrageenan in an amount of about 1 wt % to about 6 wt % with the mixture;
(4) combining carboxymethylcellulose in an amount between 0 and about 2 wt % with the mixture;
(5) combining the emulsifier in an amount between 0 and about 2 wt % with the mixture; or
(6) two or more of (1) to (5).

14. The method of claim 6, wherein the oral pouch product is tobacco-free.

15. An oral pouch product designed for insertion in the oral cavity for the sustained release of flavorant, comprising:
a porous pouch wrapper;
an inner filling material in particulate form, comprising an immobilized flavorant composition, comprising:
one or more flavorants; and
an immobilizing matrix disposed around the one or more flavorants and comprising a slightly water soluble underivatized β-cyclodextrin and microcrystalline cellulose, wherein said one or more flavorants is capable of being released from said immobilizing matrix over an extended period of time when said oral pouch product is in contact with saliva within the mouth thereby yielding the gradual delivery of said one or more flavorants.

16. The oral pouch product of claim 15, wherein
(i) the immobilizing matrix further comprises an emulsifier;
(ii) the immobilizing matrix further comprises diacetyl tartaric acid ester of mono-diglyceride;
(iii) the immobilizing matrix further comprises one or more materials selected from the group consisting of carboxymethyl cellulose, monodiglyceride, sweetener, alginate, and carrageenan;
(iv) the one or more flavorants are selected from the group consisting of savory, dairy, fruit, vegetable, spice, herb, wine, and distilled beverage flavorants;
(v) the one or more flavorants comprise a liquid flavorant;
(vi) the inner filling material further comprises a botanical material; or
(vii) two or more of (i) through (vi).

17. The oral pouch product of claim 16, wherein the liquid flavorant comprises a lipophilic flavorant.

18. The oral pouch product of claim 17, wherein the liquid lipophilic flavorant is selected from the group consisting of orange oil, mint oil, cinnamon oil, vanilla flavor, berry flavor, honey flavor, fruit flavor, and combinations thereof.

19. The oral pouch product of claim 15, wherein said inner filling material in particulate form is tobacco-free.

20. A method for preparing an oral pouch product designed for insertion in the oral cavity for the sustained release of flavorant according to claim 1, comprising:
(a) preparing an immobilized flavorant, comprising:
(i) mixing a flavorant and one or more matrix-forming materials comprising a slightly water soluble underivatized β-cyclodextrin and microcrystalline cellulose to form a mixture;
(ii) optionally heating the mixture; and
(iii) drying the mixture to form a dried immobilized flavorant; and
(b) incorporating the dried immobilized flavorant while in particular form into said oral pouch product.

21. The method of claim 20:
(1) wherein said mixing is carried out in a solvent comprising water;
(2) further comprising forming a film from the mixture, and wherein the drying of the mixture comprises forming a dried film;
(3) wherein the heating is carried out by heating the mixture to between about 180° F. and about 200° F.;
(4) wherein said mixing occurs in a ribbon blender and/or a high shear mixer;
(5) wherein said mixing occurs at atmospheric pressure;
(6) further comprising extruding the optionally heated mixture to form an extrudate and spheronizing the extrudate, and drying the spheronized extrudate to form beads of dried immobilized flavorant;
(7) wherein said mixing forms a pumpable slurry;
(8) further comprising forming a film from the mixture, and wherein the drying of the mixture comprises forming a dried film, and still further comprising pulverizing the dried film into particles; or
(9) two or more of (1) through (8).

22. The method of claim 21, wherein the particles of pulverized film have a size ranging from about 200 mesh to about 10 mm.

23. The method of claim 20, wherein
(1) the one or more matrix-forming materials further comprises an emulsifier;

(2) the one or more matrix-forming materials further comprises a material selected from the group consisting of carboxymethyl cellulose, monodiglyceride, sweetener, alginate, carrageenan, and combinations thereof;
(3) the flavorant is selected from the group consisting of savory, dairy, fruit, vegetable, spice, herb, wine, and distilled beverage flavorants;
(4) the pouch product further comprises an inner filling comprising a botanical material; or
(5) two or more of (1) through (4).

24. The method of claim 21, wherein the one or more matrix-forming materials further comprises the emulsifier and further comprising forming an emulsion of the mixture.

25. The method of claim 24, wherein the forming of the emulsion comprises subjecting the mixture to homogenization and optionally heating the mixture.

26. The method of claim 20, wherein the oral pouch product is tobacco-free.

\* \* \* \* \*